Nov. 28, 1933.    H. M. STOLLER    1,936,692
ELECTRIC REGULATOR
Filed April 22, 1918
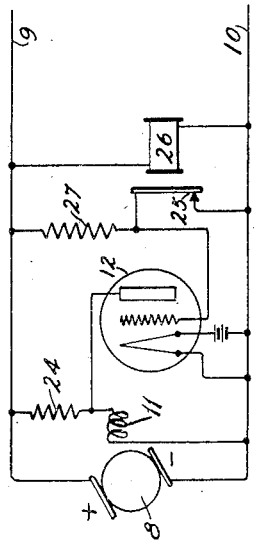
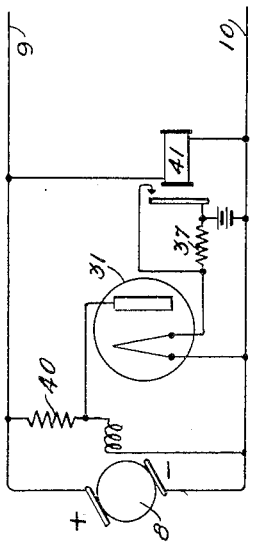
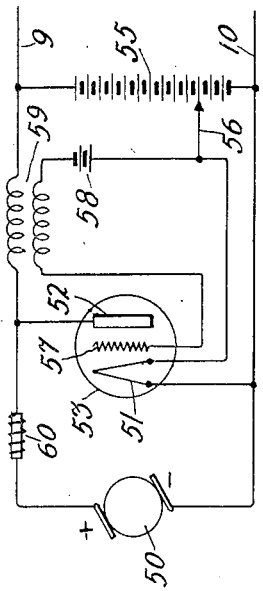
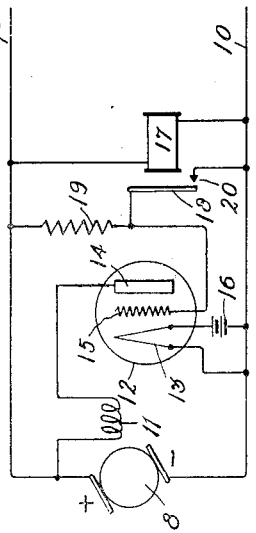
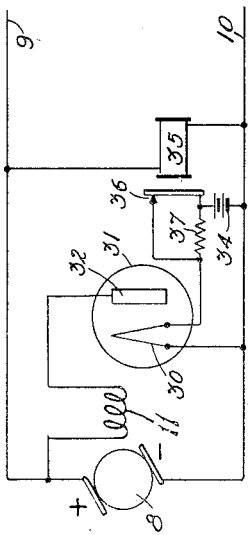
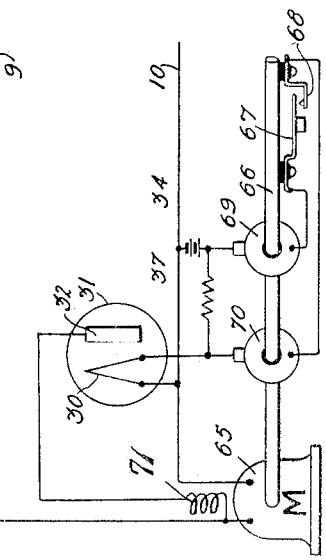
Inventor:
Hugh M. Stoller.
by J. K. Roberts Att'y.

Patented Nov. 28, 1933

1,936,692

UNITED STATES PATENT OFFICE 1,936,692

ELECTRIC REGULATOR

Hugh M. Stoller, New York, N. Y., assignor to Western Electric Company, Incorporated, New York, N. Y., a corporation of New York Application April 22, 1918. Serial No. 230,192

29 Claims. (Cl. 171—312)

This invention relates to a novel type of regulator which is applicable in general for the regulation of electrical circuits, and is particularly adapted to be employed for regulating the electrical output such as the voltage or current of a generator or for controlling the electrical energy applied to a motor in order that its speed may be regulated.

It is well known that aeroplanes are provided with radio signaling apparatus to provide communication between aeroplanes as well as between an aeroplane and a station on the ground. The signaling apparatus on the aeroplane requires electrical power for its operation, and it is the custom to derive this power from a generator mounted on the aeroplane and driven by the wind, due to the motion of the aeroplane. The speed of the wind is far from constant and the generator is subject to large variations in speed which result in an undesirable fluctuation in the voltage generated. The novel type of regulator herein described is especially suitable for use on aeroplanes because it is light in weight, substantially free from sparking, simple, automatic and efficient. While its advantage of being light in weight may not be of much importance if this regulator is used in some service other than aero service, the advantages of freedom from sparking and good regulation still obtain.

The regulator provided according to the present invention is of the thermionic type such as an audion comprising a vacuum tube containing electrodes. The manner in which such a vacuum tube is employed as a regulator is this: The vacuum tube comprises a cathode which serves as a source of electrons that travel to the anode or plate electrode. The amount of this electron stream or space current depends upon several factors, primarily upon (a) the voltage applied between these electrodes, (b) the temperature of the cathode, an increase in temperature producing a stronger space current, and (c) the potential of the grid electrode with respect to the filament.

If it is desired to regulate the output of a generator, the field winding thereof may be connected in circuit with the cathode and plate electrodes. The output of the generator depends of course upon the field current, which flows between the cathode and plate electrodes and which may be varied in intensity by varying the current which heats the cathode, or by varying the potential applied to the grid. An increase in the voltage or current of the generator serves to modify the space current and the desired regulation is obtained.

A regulator comprising such a vacuum tube is light in weight not only because a vacuum tube has almost a negligible weight, but also because no bulky apparatus is required in its operation. The regulator is furthermore substantially free from sparking on account of the small currents necessary for its operation, and also because it has been found that the energy usually dissipated in the form of a spark is absorbed within the vacuum tube itself in the form of an internal discharge. These advantages of the thermionic regulator, as well as its simplicity, will be apparent from the following detailed description of the invention.

As the thermionic device may be associated with the electric machine in a variety of ways, several forms that this invention may assume will now be described in detail in connection with the drawing in which Fig. 1 shows one embodiment of this invention where a tube of the three-electrode type is connected in series with the field winding of a self-excited generator; while Fig. 2 shows such a tube connected in parallel with the field winding of a generator; Figs. 3 and 4 show how a two-electrode tube may be employed for the purposes of this invention; Fig. 5 shows this invention in connection with a motor; and Fig. 6 illustrates how this invention may be adapted to regulate fluctuations of the voltage of a generator that may be either separately or self-excited.

Referring more particularly to Fig. 1, 8 is a self-excited shunt generator which is adapted to supply voltage across leads 9 and 10 to any desired apparatus, such as translating devices. In series with the field winding 11 of the generator is a vacuum tube 12 containing a cathode or filament 13, an anode 14 and an auxiliary electrode 15, the filament 13 of which is connected to the lead wire 10, while the anode 14 is connected through the field winding 11 to lead wire 9. The filament 13 is heated by the battery 16. The current through field winding 11 depends upon the impedance between the filament and anode of tube 12, so that any change in the impedance of the tube will vary the current through the field winding and consequently vary the voltage output of the generator. 17 is an electromagnetic relay which is shunted between leads 9 and 10, its moving contact 18 is connected to grid 15, which is also connected through a high resistance 19 to lead 9. The stationary contact 20 of the relay is connected to lower lead 10. Relay 17 should be so constructed and adjusted that it attracts its armature when the voltage between leads 9 and 10 exceeds a predetermined value while releasing at a somewhat lower value, these two values preferably being the limitation of range of fluctuation permissible in the voltage supplied by the generator 8. Thus if the desired voltage from the generator 8 is 300 volts, for example, then the relay 17 may be designed to make contact, say at 303 volts, and to release at 297 volts. These limits, however, could be made larger or smaller and depend moreover upon how much variation of voltage could be allowed in each particular case of regulation.

As is well known, the effective impedance between the anode and filament of a vacuum tube depends upon the value of the potential applied to the grid, the less negative or more positive the grid, the smaller will be the effective impedance. In the case under consideration, when contact 18 is open, the potential of the grid will be determined by the value of resistance 19 and would be somewhat more positive than the filament 13, thereby making the impedance of the tube comparatively low. When contact 18 is closed, however, the potential of the grid is practically the same as the potential of the filament, which condition would mean less space current in the tube than with contact 18 open, and consequently a higher value for the impedance of the tube.

The operation of the regulator would therefore be as follows. If while the generator is delivering the normal voltage the speed, for example, of the generator should be suddenly increased, there would be a tendency of the voltage output of the generator to increase likewise. As soon, however, if we assume the values above cited, as the voltage rises to 303 volts the contact 18 would be closed, the space current and consequently the field current would immediately be decreased, thereby lowering the output voltage of the generator. If, however, the voltage would then decrease to 297 volts or below, contact 18 would open again, thereby increasing the field current and the voltage. In the operation of the device where the output voltage of the generator is subjected to considerable variation, it is found that the contact 18 will vibrate practically continuously in such a manner as to give the grid the average potential which is necessary to keep the field current at such values as to give the substantially constant voltage desired. This vibration, however, does not produce any sparking between the contacts, since they carry only a small amount of current.

Fig. 2 illustrates another method of controlling the field current of a generator by having the vacuum tube 12 shunted across the field winding 11. It is preferable with such an arrangement to have an impedance such as a resistance 24 in series with the field winding. In this case the current through the resistance 24 divides and part goes through the field winding 11 and part through the vacuum tube 12. Any variation in the impedance of the vacuum tube will therefore vary the field current so that by controlling the impedance of the vacuum tube in the manner previously described, the output voltage from the generator may be held substantially constant. As in Fig. 1, when the contact 25 of relay 26 is open, the grid potential is determined by the value of a resistance 27; while when the contact is closed, the potential of the grid is much lower and substantially the same as the filament of the tube. In this case, however, the relay contact 25 is closed when the relay is unactuated.

In Fig. 3 is illustrated a regulator in which only a two-electrode tube is required. As in Fig. 1 the filament 30 of the tube 31 is connected to line 10, while the anode 32 is connected to the line 9 through the field winding 11. The action in this case depends upon the property of a vacuum tube, that the current flowing between the heated cathode and the anode depends upon the temperature of the cathode, the greater the temperature the greater the space current. Battery 34 is a source of current for heating the filament, and relay 35 by means of its contact 36 serves to make and break a short circuit around a resistance 37 that is in series with battery 34, whereby the filament current may be varied. If now the relay is energized and deenergized at certain prescribed limits, the filament current may be varied in such a manner as to give the proper average value of space current to produce substantially the same voltage output of the generator regardless of considerable changes in the speed or load of the generator.

Fig. 4 is a modification of Fig. 3 in which the vacuum tube 31 is placed in parallel with the field winding. As in Fig. 2, a resistance 40 is in series with the field winding, and similarly to Fig. 3, the filament current is varied by a relay 41. In this case, however, the short circuit around resistance 37 is open when the relay is deenergized.

Fig. 5 shows how the circuit arrangement of Fig. 3 may be modified so that it may be employed to regulate the speed of a motor supplied with a variable voltage. 65 is a motor having an axle 66 on which is mounted a centrifugally controlled contact 67 and a stationary contact 68 which are electrically connected to slip rings 69 and 70 respectively. Contact 67 would be designed to close when the speed of the motor would tend to increase beyond the value desired. Brushes on these rings 69 and 70 are connected to the opposite terminals of the resistance 37 which is in the filament circuit of the tube 31, as in Fig. 3.

When the voltage across leads 9 and 10 would suddenly increase, tending to speed up the motor, the contact 67 would close, short-circuiting resistance 37, increasing the current flowing through the tube and the field winding 71, thereby retarding the speed of the motor. It would follow that contact 67 would open and close in such a manner as to make the impedance of the tube sufficient to regulate the field current to the extent necessary for every particular change in the voltage supply from leads 9 and 10. The circuits of Figs. 1, 2 and 4 may be modified in a similar manner if it is desired to employ them for the regulation of motors. Thus for Fig. 2 the centrifugally controlled contact which would be necessary should close with increase in speed, while for Figs. 1 and 4, the centrifugally controlled contacts should remain closed for the normal speed of the motor, but should open with increase in speed.

The arrangement shown in Fig. 6 is designed specifically to compensate for small fluctuations in the voltage of a battery charging generator 50. As in the other figures, the filament 51 and the anode 52 of the vacuum tube 53 are connected between the lead wires 9 and 10 which lead to the battery 55 which is to be charged. The filament current is shown to be supplied by a portion of this battery tapped off by contact 56. The grid 57 is poled at a negative potential with respect to the filament by a small battery 58. By means of a transformer 59 fluctuations in the line 9 produce corresponding variations in the potential of the grid 57. An increase in the voltage along line 9 will make the grid more positive, thereby tending to increase the current flowing through the vacuum tube. This space current change will produce a corresponding change in the current flowing through the impedance or choke coil 60 which may change the impedance drop across its terminals an amount sufficient to practically annul the fluctuations from the generator.

It is obvious that the electrical values of the various apparatus employed in the above circuits will depend upon the voltage generated, the load, as well as other conditions. As an example of the order of magnitude the various values might have in a specific case where the output voltage was 300 volts, the following may be cited: In Fig. 1 the number of turns of field winding 11 was 7000, with a resistance of 1300 ohms, and resistance 19 was 10,000 ohms. In Fig. 2, the field winding had 5500 turns with a resistance of 800 ohms, while resistance 24 had a value of 600 ohms, and resistance 27, a value of 8000 ohms. The values for Fig. 1 would also apply to Fig. 3, while the values of Fig. 2 would apply to Fig. 4. The value of resistance 37 in Figs. 3 and 4 should preferably be the same as the resistance of the filament of the tube. These values, however, are not intended in any wise to limit this invention.

It is obvious that various changes may be made in the above circuit arrangements without departing in any wise from the spirit of this invention which is defined in the appended claims.

What is claimed is:

1. The combination with an electric machine having an exciting winding, of a regulator associated with said winding, said regulator comprising a vacuum tube having an anode and a cathode, a source of current for said cathode, and means responsive to fluctuations in a characteristic of said machine for changing the current through said cathode whereby the current through said winding may be regulated.

2. A direct current generator, a regulator for said generator comprising a vacuum tube having an anode and a cathode, means for heating said cathode, and electromagnetic means responsive to changes in a characteristic of said generator for varying the temperature of said cathode.

3. An electric circuit comprising an electric machine, a regulator for said machine comprising a vacuum tube having an anode and a cathode, said anode and cathode being connected to opposite poles of said machine, means for heating said cathode, and electromagnetic means responsive to fluctuations in said circuit for varying the heating of said cathode to control the space current between said cathode and said anode.

4. A direct current generator having a shunt field winding, a regulator for said generator comprising a vacuum tube having an anode and a cathode in series with said winding, a source of direct current for heating said cathode, a resistance in circuit with said source and said cathode, and a relay responsive to the voltage of said generator and having an armature adapted to control said resistance.

5. In combination with a direct current generator having an exciting winding, a vacuum tube having an anode and a cathode, said anode and cathode being so connected to said winding that changes in current between said anode and cathode produce changes in the current of said exciting winding, and means for supplying heating current to said cathode and for varying the temperature of said cathode in response to changes in the output of said generator.

6. In combination, an electric machine having an exciting winding, a vacuum tube of the unidirectional type having an anode and a filamentary cathode between which space current is adapted to flow, connections between said winding and said anode and cathode whereby the current through said winding is simultaneously changed when changes occur in said space current, said vacuum tube being responsive to fluctuations in a characteristic of said machine for reducing said fluctuations to a low value.

7. In combination, an electric machine having an exciting winding, a vacuum tube having an anode and a cathode between which space current is adapted to flow, connections whereby changes in space current between said anode and cathode produce changes in the current of said winding, and means for supplying heating current to said cathode and for varying said heating current in accordance with fluctuations in a characteristic of said machine whereby the resultant changes in the space current of said tube serve to regulate said machine.

8. In combination, an electric machine, main circuit current leads connected to said machine, a vacuum tube having an anode and a cathode for controlling a characteristic of said machine, connections from said anode and cathode to said leads whereby only a small portion of the main circuit current passes through said tube, means for supplying heating current to said cathode and means for varying the heating current supplied to said cathode in response to variations in the characteristic of said machine to maintain said characteristic substantially constant.

9. In an electric system an electric circuit including a source of potential, a vacuum tube having an anode and a cathode connected in shunt to said source, means for supplying heating current to said cathode, and means responsive to fluctuations in an electrical condition of said circuit for regulating a condition of said circuit through the intermediary of changes in the heating current supplied to said cathode.

10. In an electric system, an electric circuit including a source of potential, a vacuum tube having an anode and a cathode, circuit connections for supplying said tube with space current from said source, means for supplying heating current to said cathode, and a relay supplied with operating current from said source, said relay being responsive to fluctuations in a characteristic of said circuit for regulating a condition of said circuit through the intermediary of changes in the heating current supplied to said cathode.

11. In an electric system, an electric circuit including a source of potential, a vacuum tube having an anode and a cathode, circuit connections for supplying said tube with space current from said source, a source of heating current for said cathode, and means responsive to fluctuations in an electrical condition of said circuit for varying the current supplied to said cathode to regulate said space current.

12. An electrical system comprising a source of potential, a vacuum tube having an anode and a cathode, connections for supplying said tube with space current from said source, means for supplying heating current to said cathode, and a relay responsive to changes in a condition of said system which tend to produce changes in said space current for regulating said space current through the intermediary of changes in the heating current supplied to said cathode.

13. An electrical system comprising a source of voltage, a vacuum tube having an anode and a cathode, connections from said source for supplying said tube with space current from said source, a source of voltage for supplying heating current to said cathode, a relay having a stationary contact and a movable contact, and a by-path in said heating circuit comprising said stationary contact and said movable contact, said relay operating upon changes in the current supplied thereto for making and breaking said by-path.

14. In an electric system, an electric circuit including a source of voltage, main circuit leads from said source, a vacuum tube having an anode and cathode connected in shunt to said leads, means for supplying heating current to said cathode and means for varying said heating current in accordance with fluctuations in a characteristic of said circuit whereby said fluctuations are reduced to a low value.

15. In combination an electric machine, supply leads for said machine subject to a varying electrical condition, a thermionic regulator for said leads comprising an anode and a cathode, connections from said anode and cathode to said leads whereby only a small portion of the current in said leads passes between said electrodes, a source of heating current for said cathode and means responsive to variations in a condition of said leads for regulating a characteristic of said leads through the intermediary of variations in the heating current supplied to said cathode.

16. In combination an electric machine having an exciting winding, main circuit leads for said machine, a vacuum tube regulator of the unidirectional type having an anode and a filamentary cathode, said winding, said anode and said cathode being connected in shunt to said leads, and means responsive to variations in a characteristic of said leads for holding substantially constant a characteristic of said leads through the intermediary of changes in the space current between said anode and said cathode.

17. A dynamo electric machine regulating system comprising a dynamo electric machine, an electronic valve arranged in its field circuit to regulate its field excitation and having a heated cathode, and means to vary the action of said valve in substantial coincidence and accordance with variations in the condition to be regulated.

18. A generator regulating system comprising a generator, an electronic valve arranged in its field circuit to regulate its field excitation, and means to vary the action of said valve in substantial coincidence and accordance with variations in the generator voltage.

19. A generator regulating system comprising a generator, an electronic valve arranged in its field circuit to regulate its field excitation and having a heated cathode, and means to vary the action of said valve in substantial coincidence and accordance with variations in the generator voltage.

20. A generator regulating system comprising a generator an electronic valve arranged in its field circuit to regulate its field excitation and having an auxiliary anode, and means to vary the auxiliary anode voltage in substantial coincidence and accordance with variations in the generator voltage.

21. A generator regulating system comprising a generator, an electronic valve arranged in its field circuit to regulate its field excitation and having a heated cathode and an auxiliary anode, and means to vary the auxiliary anode voltage in substantial coincidence and accordance with variations in the generator voltage.

22. Regulating apparatus for a generator comprising an electronic valve, means to connect said valve in the field circuit to regulate the field excitation, and means to vary the action of said valve in substantial coincidence and accordance with variations in the generator voltage.

23. In a regulator system, a dynamo-electric machine having a regulating field-magnet winding, means comprising a substantially pure electron space discharge device having an anode and a cathode connected in circuit with said field winding and a grid element, and means for controlling said grid element according to a characteristic of the machine to govern the machine excitation by said device and maintain the machine characteristic constant.

24. In a regulator system, a direct current dynamo-electric machine having a regulating field-magnet winding, a space discharge device having a cathode and an anode connected in circuit with said field winding to the machine circuit and a grid element, and means for controlling said grid element according to a characteristic of the machine to govern the current flow through the device and said field winding and maintain the machine characteristic constant.

25. In a regulator system, a dynamo-electric machine having a regulating field-magnet winding, means comprising an electric space discharge device having an anode and a cathode connected in circuit with said field winding and a grid element, and means for controlling said grid element according to a characteristic of the machine to exert a continuous regulating action upon the machine of a magnitude at any instant dependent upon the instantaneous potential of the grid element whereby said device serves to maintain the machine characteristic substantially constant.

26. In a regulator system, a dynamo electric machine, a space discharge device arranged in its field circuit to regulate its field current independently of the machine power current, and means to vary the action of said device in substantial coincidence and accordance with variations in the condition to be regulated.

27. A dynamo electric machine regulating system comprising a dynamo electric machine, an electronic valve arranged in its field circuit to regulate its field current independently of the machine power current and having an auxiliary anode to control its action, and means to vary the auxiliary anode voltage in substantial coincidence and accordance with variations in the condition to be regulated.

28. Regulating apparatus for a dynamo electric machine comprising an electronic valve, means to connect said valve in the field circuit to regulate the machine field current independently of the machine power current, and means to vary the action of said valve in substantial coincidence and accordance with variations in the condition to be regulated.

29. A dynamo electric machine regulating system comprising a dynamo electric machine, an electric valve arranged in its field circuit to regulate its field excitation and having an auxiliary anode to control its action, and means for controlling said auxiliary anode according to a characteristic of the machine to exert a continuous regulating action upon the machine of a magnitude at any instant dependent upon the instantaneous potential of the auxiliary anode whereby said valve serves to maintain the machine characteristic substantially constant.

HUGH M. STOLLER.